United States Patent
Blümel et al.

(10) Patent No.: US 6,813,992 B2
(45) Date of Patent: Nov. 9, 2004

(54) BAKING OVEN

(75) Inventors: Frank Blümel, Mönchsroth (DE); Bernd Dannenhauer, Dinkelsbühl (DE); Dieter Knost, Osnabrück (DE)

(73) Assignee: Werner & Pfleiderer LebensmittelteHchnik GmbH, Dinkelsbühl (DE)

( * ) Notice: Subject to any disclaimer, the term of this patent is extended or adjusted under 35 U.S.C. 154(b) by 0 days.

(21) Appl. No.: 10/673,037

(22) Filed: Sep. 29, 2003

(65) Prior Publication Data
US 2004/0129147 A1 Jul. 8, 2004

(30) Foreign Application Priority Data

Sep. 28, 2002 (DE) .......................... 102 45 464

(51) Int. Cl.[7] .............. A23L 1/00; A47J 27/04; A47J 27/16; F22B 7/00; F22B 37/26
(52) U.S. Cl. .............. 99/330; 99/427; 99/467; 99/476; 99/516
(58) Field of Search .............. 99/330, 331, 352–355, 99/339, 340, 467–476, 427, 448, 483, 443 R, 443 C, 444–450, 516, 536; 126/20, 369, 20.1, 20.2, 21 A, 369.1; 219/400, 401, 393, 411; 426/466, 523

(56) References Cited

U.S. PATENT DOCUMENTS

| | | | | |
|---|---|---|---|---|
| 2,123,040 A | * | 7/1938 | Hanak .......................... 99/352 |
| 5,129,384 A | * | 7/1992 | Parks ....................... 126/21 A |
| 5,394,791 A | * | 3/1995 | Vallee .......................... 99/427 |
| 5,530,223 A | * | 6/1996 | Culzoni et al. .............. 219/401 |
| 5,558,010 A | * | 9/1996 | Shelton ........................ 99/468 |
| 5,615,603 A | * | 4/1997 | Polin ............................ 99/331 |
| 5,676,051 A | * | 10/1997 | Sinemus ....................... 99/476 |
| 5,694,835 A | * | 12/1997 | Mangina ...................... 99/468 |
| 5,704,278 A | * | 1/1998 | Cross .......................... 99/427 |
| 5,732,614 A | * | 3/1998 | Oslin ........................... 99/341 |
| 5,816,234 A | * | 10/1998 | Vasan ....................... 126/21 A |
| 6,237,469 B1 | * | 5/2001 | Stritzl et al. .................. 99/330 |
| 6,453,802 B1 | * | 9/2002 | Manganiello et al. ......... 99/330 |

FOREIGN PATENT DOCUMENTS

| | | |
|---|---|---|
| DE | 24 25 296 | 12/1974 |
| DE | 25 17 827 | 11/1976 |
| GB | 2 245 136 | 1/1992 |

* cited by examiner

Primary Examiner—Timothy F. Simone
(74) Attorney, Agent, or Firm—Browdy and Neimark, P.L.L.C.

(57) ABSTRACT

A baking oven comprises a charging section with an inlet for dough pieces to be loaded; a baking chamber; and a discharging section with an outlet for baked dough pieces to be unloaded. Provision is made for a circulating-air arrangement with a source that generates a flow of circulating air, a circulating-air heating device, and a circulating-air guiding channel, sections of which are formed by the baking chamber. An outer wall of the baking chamber is rotationally symmetrical about a vertical axis of rotation, expanding steadily upwards in particular in the shape of a funnel. A baking oven results, in which the dough pieces can be moved and distributed as regularly as possible during baking.

12 Claims, 3 Drawing Sheets

BAKING OVEN

BACKGROUND OF THE INVENTION

1. Field of the Invention

The invention relates to a baking oven comprising a charging section with an inlet for dough pieces to be loaded; a baking chamber; a discharging section with an outlet for baked dough pieces to be unloaded; a circulating-air arrangement, which is comprised of a source generating a flow of circulating air, a circulating-air heating device, and a circulating-air guiding channel, at least sections of which are formed by the baking chamber.

2. Background Art

A baking oven of the generic type has been disclosed by prior public use. Baking ovens of the species are still in need of improvement regarding the baking time of dough pieces and the possibilities of implementation.

SUMMARY OF THE INVENTION

It is an object of the present invention to further develop a baking oven of the type mentioned at the outset in such a way that reduced baking periods can be achieved, accompanied with simultaneously improved handling of the baking oven.

According to the invention this object is attained with a baking oven comprising a baking-chamber outer wall which is rotationally symmetrical about a vertical axis of rotation, expanding steadily upwards in particular in the shape of a funnel; and a driving device, by means of which the outer wall is driven in rotation about the axis of rotation.

According to the invention it has been found that more efficient baking of dough pieces will result when the dough pieces are moved in a flow of circulating air and when they are distributed as uniformly as possible within the baking chamber. Moving the dough pieces within the baking chamber and distributing them as uniformly as possible can be put into practice by the baking chamber having an outer wall that is shaped and actuated according to the invention.

A baking chamber that has an additional inner wall offers more favourable conditions of flow for the circulating air that streams through the baking chamber.

Yet another improvement of the circulating-air flow behavior is attained with an inner wall that is rotationally symmetrical about a vertical axis of rotation, steadily expanding upwards, in particular in the shape of a cone and parallel to the outer wall.

Uniform circulating-air flow in the baking chamber can be obtained with an inner wall that has circulating-air passages. Moreover, it is possible to adapt the position of the circulating-air passages to the shape of the baking chamber so that circulating air of equal temperature streams through nearly the entire baking chamber, which works in favour of uniform baking results.

A baking-chamber closing arrangement, which is disposed at the bottom of the baking chamber and which is displaceable by an actuator between a baking position, in which the baking-chamber closing arrangement closes the baking chamber at the bottom, and a position for discharge, in which it produces a connection between the baking chamber and the discharging section, enables the baked dough pieces to be discharged automatically from the baking chamber.

A baking-chamber closing arrangement that forms part of the circulating-air guiding channel simplifies the constructional design of the baking oven.

Automatic discharge of the baked articles will take place in a particularly simple way when a slope is provided between the baking chamber and an outlet, the slope being part of the discharging section.

With the baking-chamber closing arrangement and an unloading door that closes the outlet embodied for controlled displacement, a controlled baking cycle can be put into practice, followed by fully automatic discharge of the baked articles. Such a baking cycle can be started automatically for instance by the addition of dough pieces into the charging portion of the baking oven.

An embodiment of the baking oven comprises a vacuum pump which is connected to the baking chamber and designed for controlled actuation and by which to set a given negative pressure in the baking chamber. This facilitates heating the baking chamber at the beginning of a baking process.

By alternative of, or in addition to, that preferred embodiment, provision can be made for a steaming assembly which is connected to the baking chamber and designed for controlled actuation and by which to supply the baking chamber with steam. The steaming assembly ensures controlled humidification of the dough pieces, meaning improved baking results. More uniform humidification of the dough pieces can be obtained when the steaming assembly cooperates with a vacuum pump, which will still further improve the baking result.

Details of the invention will become apparent from the ensuing description of an exemplary embodiment of the invention, taken in conjunction with the drawing.

DESCRIPTION OF THE PREFERRED EMBODIMENT

Figure 1:
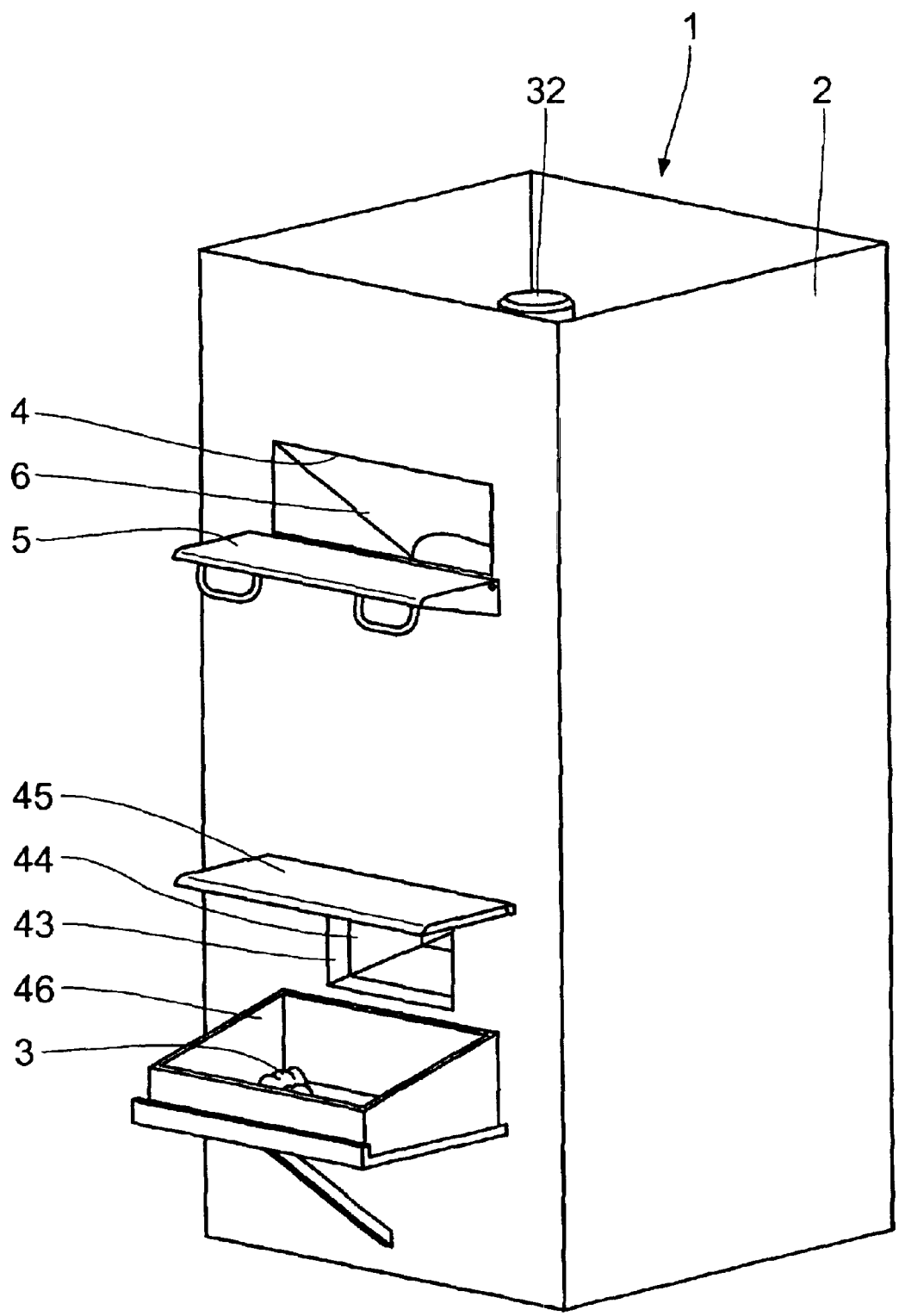
FIG. 1 is a perspective outer view of a baking oven.

The baking oven, which is designated in its entirety by the reference numeral 1 in FIG. 1, comprises a oven casing 2 of a square base of 1 m$^2$ and a height of approximately 2 m. Dough pieces 3, for instance deep frozen or partially defrosted rolls, are fed into the interior of the baking oven 1 via an inlet 4 that can be closed by a loading door 5 which is preferably manually operated and shuts tightly. The inlet 4 is followed by a doorway 6 that leads to an annular baking chamber 7, the diameter of which increases upwards. The baking chamber 7 is rotationally symmetrical and defined outwards by a funnel-shaped, outer wall 8 that expands upwardly. The baking chamber 7 is defined inwards by a conical inner wall 9 that expands upwards in cross-sectional shape. The baking chamber 7 and the walls 8, 9 have a joint, vertical axis of symmetry 10.

The inner wall 9 is supported by a holding bar 11 which extends centrally along the axis of symmetry 10, the holding bar 11 being carried by a holding plate 12 which is disposed above the doorway 6 in the oven casing 2.

The outer wall 8 is rotatable about the axis of symmetry 10. To this end, it is mounted in the vicinity of the bottom of the baking chamber 7 by three ball bearings which are regularly distributed around the axis of symmetry 10 in the circumferential direction, forming a first radial bearing 13 for the outer wall 8. The first radial bearing 13 as well as the bearings described below are illustrated only diagrammatically in the drawing. On the side of the casing, the first radial bearing 13 is mounted on a first intermediate bottom 14 in the oven casing 2.

In the upper part of the baking chamber 7, above a horizontal boundary wall 15 of the inner wall 9, the outer wall 8 is connected to an inner bearing sleeve 17 by way of three cross struts 16 that are regularly distributed in the circumferential direction, the sleeve 17 rotarily enclosing the holding bar 11. The inner bearing sleeve 17 is housed in an outer bearing sleeve 20 for rotation about the axis of symmetry 10 by way of a second radial bearing 18, which is an encircling ball bearing, and an axial/radial bearing 19, which comprises two encircling ball bearings. The sleeve 20 is tightly joined to a second intermediate bottom 21, disposed above the cross struts 16, of the baking oven 1. The inner bearing sleeve 17 supports a horizontal driving pulley 22 that encloses the holding bar 11 and can be driven via a V belt 23 by a driving motor (not shown). The driving motor serves for rotation of the outer wall 8 of the baking chamber 7 about the axis of symmetry 10.

The baking chamber 7 is defined downwards by a baking-chamber closing arrangement 24 with a cylindrical jacket wall 25 that is covered upwards by a convex grid 26. The baking-chamber closing arrangement 24 is displaceable between a baking position seen in FIG. 2 and a position for discharge seen in FIG. 3. Via a joining element 27 and a slide rod 28, the jacket wall 25 is connected to a lifting cylinder 29 which is supported by a third baking-oven-1 intermediate bottom 30 which is disposed below the baking-chamber closing arrangement 24 and heat-insulated. In the baking position, the outer peripheral area of the grid 26 of the baking-chamber closing arrangement 24 bears directly against a funnel-shaped baffle 31 that is mounted on the bottom end of the inner wall 9.

Figure 2:
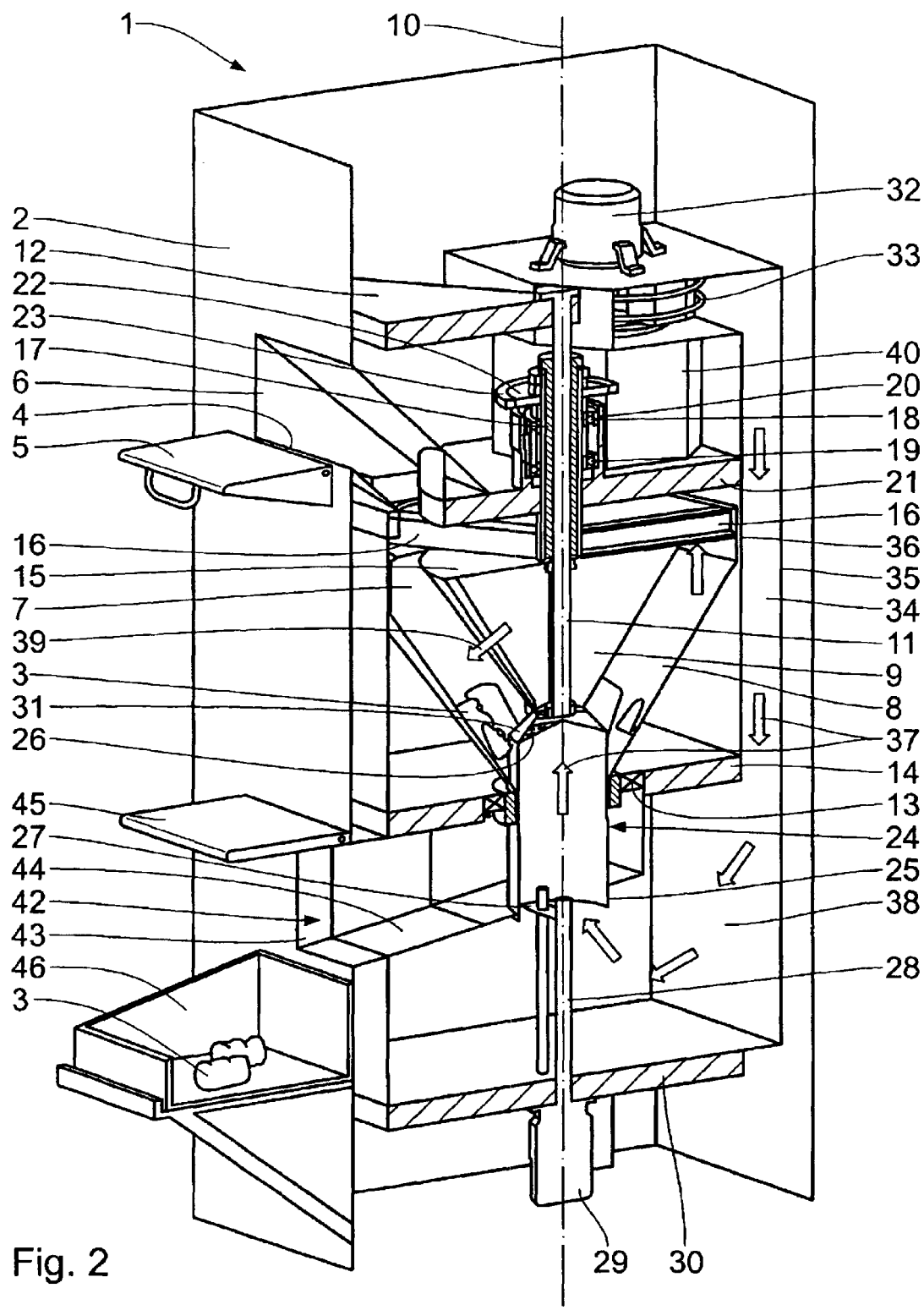
FIG. 2 is a perspective inner view, broken open, of the baking oven of FIG. 1 with a baking-chamber closing arrangement in a position for baking.

The baking chamber 7 is heated by heated circulating air that is generated by a fan 32 with an electric heating element 33; the fan 32 is supported by the second intermediate bottom 21. Circulating air heated by the heating element 33 passes through a first circulating-air guiding channel section 34 which is formed between a lateral inside casing wall 35 and a baking-chamber-casing wall 36 that envelops the outer wall 8. As roughly outlined in FIG. 2 by arrows of flow direction 37, the circulating air passes from the first circulating-air guiding channel section 34 into a circulating-air collecting chamber 38 that is disposed between the first intermediate bottom 14 and the third intermediate bottom 30. The circulating air passes from the circulating-air collecting chamber 38 into the baking-chamber closing arrangement 24 that is open downwardly, from where it flows through the grid 26 and, guided by the baffle 31, through holes in the baffle 31 and into the inner wall 9. Passages in the inner wall 9 admit the circulating air to the baking chamber 7, which is shown in FIG. 2 by the arrow of flow direction 39. The holes in the baffle 31 and the passages in the inner wall 9 are not shown in the drawing. The circulating air leaves the baking chamber 7 via a second circulating-air guiding channel section 40 in a direction towards the fan 32.

Figure 3:
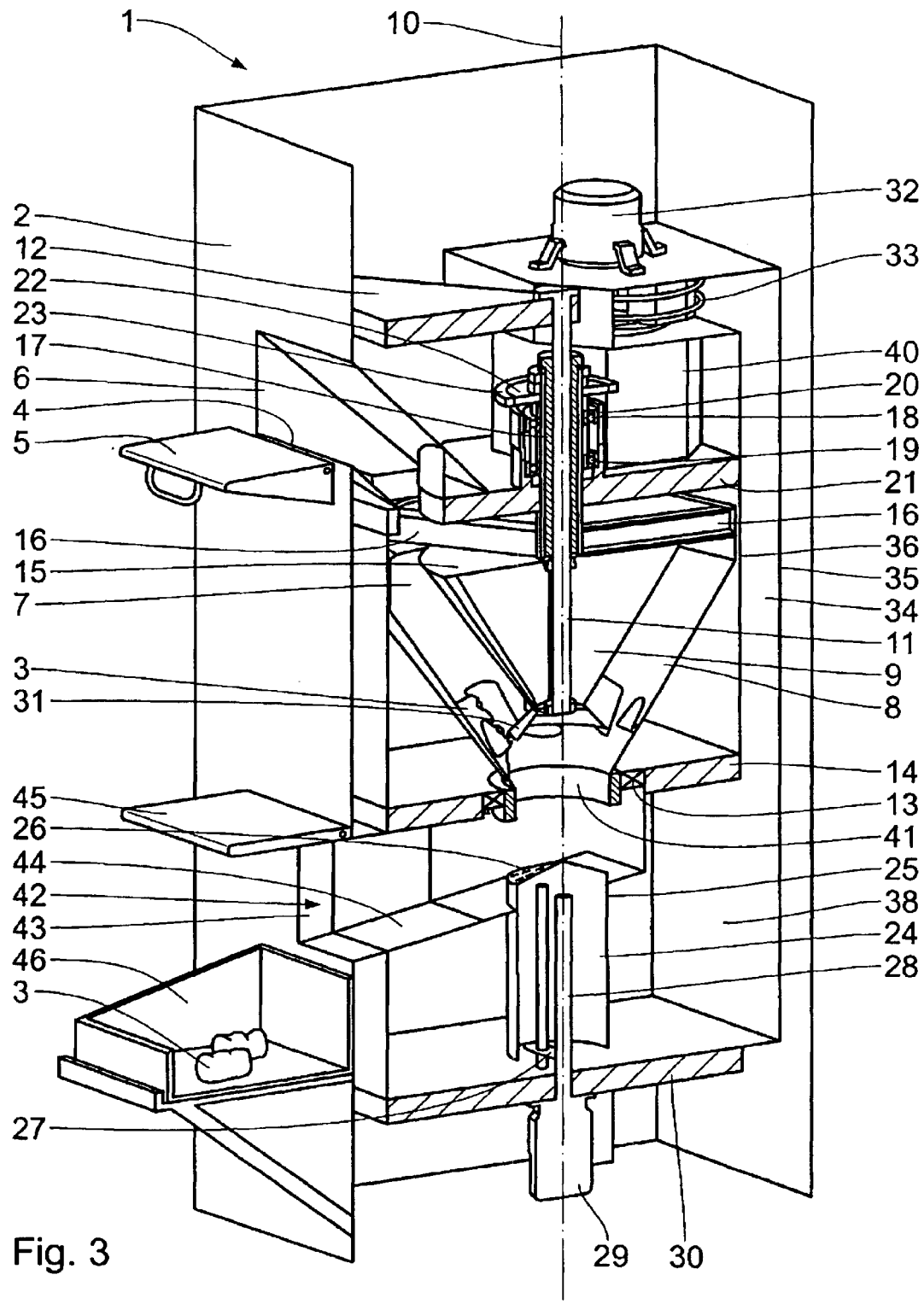
FIG. 3 is an illustration, similar to FIG. 2, with the baking-chamber closing arrangement in a position for discharge.

FIG. 3 illustrates the baking-chamber closing arrangement 24 in a position for discharge, in which it is displaced downwards, as against the baking position, by the aid of the lifting cylinder 29. This leaves open an aperture 41 in the first intermediate bottom 14 of the baking chamber 7. The round aperture 41 connects the baking chamber 7 to an unloading passageway 42 that has a slope 44 towards an outlet 43. The outlet 43 can be shut by a motor pivoted unloading door 45. A baked-article collecting box 46 is disposed below the outlet 43.

The baking oven 1 is operated as follows:

The loading door 5 is opened for the baking oven 1 to be loaded with a charge of for example 45 rolls. At this time, the baking-chamber closing arrangement 24 is in the baking position. Then the dough pieces 3 are led into the baking oven 1, sliding through the doorway 6 into the baking chamber 7 and collecting on the bottom of the baking chamber 7 that is closed by the closing arrangement 24. Then the outer wall 8 is set rotating by the driving motor and the fan 32 and the heating element 33 are activated. By reason of the centrifugal force occasioned by rotation of the outer wall 8, the dough pieces 3 are distributed uniformly on the outer wall 8 and within the baking chamber 7. Simultaneously, the dough pieces 3 are heated and baked by the heated circulating air that passes through the baking chamber 7. After termination of the baking process, rotation of the outer wall 8 is stopped or distinctly reduced for the baked dough pieces 3 to collect on the bottom of the baking chamber 7 under the action of gravity. With the aid of the lifting cylinder 29, the baking-chamber closing arrangement 24 is moved by timed actuation into the position for discharge of FIG. 3. Simultaneously the unloading door 45 opens by timed control. The baked dough pieces 3 leave the baking chamber 7 through the aperture 41 under the action of gravity, sliding along the slope 44 towards the outlet 43 and falling through it into the baked-article collecting box 46. The baking time is approximately 12 minutes.

An embodiment (not shown) of the baking oven 1 additionally comprises a vacuum pump by which to set given negative pressure in the baking chamber 7. Simultaneously, this embodiment of the baking oven 1 includes a steaming assembly, known per se, by which to supply water vapor to the baking chamber 7.

In this embodiment, the baking chamber 7 is evacuated by the vacuum pump at the beginning of the baking process so that the dough pieces 3 in the baking chamber can be heated more rapidly by the circulating air. Interaction of the vacuum pump and the steaming assembly helps obtain more efficient humidification of the dough pieces by steam.

In keeping with another embodiment (not shown) of the baking oven, the job of opening and closing the loading door 5 is controlled automatically.

What is claimed is:

1. A baking oven (1), comprising
   a charging section (4, 6) with an inlet (4) for dough pieces (3) to be loaded;
   a baking chamber (7);
   a discharging section (42, 43) with an outlet (43) for baked dough pieces (3) to be unloaded;
   a circulating-air arrangement, which is comprised of
     a source (32) generating a flow of circulating air (37, 39),
     a heating device (33) for circulating air,
     a guiding channel (34, 38, 24, 9, 7) for circulating air, at least sections of which guiding channel (34, 38, 24, 9, 7) are formed by the baking chamber (7);
   an outer wall (8) of the baking chamber (7), the outer wall (8) being rotationally symmetrical about a vertical axis of rotation (10) and expanding steadily upwards; and
   a driving device (22, 23), by means of which the outer wall (8) is driven in rotation about the axis of rotation (10).

2. A baking oven according to claim 1, wherein the baking chamber (7) comprises an inner wall (9) in addition to the outer wall (8).

3. A baking oven according to claim 2, wherein the inner wall (9) is rotationally symmetrical about a vertical axis of rotation (10), steadily expanding upwards.

4. A baking oven according to claim 2, wherein the inner wall (9) has circulating-air passages.

5. A baking oven according to claim 1, comprising a baking-chamber closing arrangement (24), which is disposed at the bottom of the baking chamber (7) and which is displaceable by an actuator (29) between a baking position, in which the baking-chamber closing arrangement (24) closes the baking chamber (7) at the bottom, and a position for discharge, in which it produces a connection between the baking chamber (7) and the discharging section (42, 43).

6. A baking oven according to claim 5, wherein the baking-chamber closing arrangement (24) forms part of the guiding channel (34, 38, 24, 31, 9, 7) for circulating air.

7. A baking oven according to claim 1, comprising a slope (44) between the baking chamber (7) and an outlet (43), the slope (44) being part of the discharging section (42, 43).

8. A baking oven according to claim 7, wherein the baking-chamber closing arrangement (24) and an unloading door (45) that closes the outlet (43) are embodied for controlled displacement.

9. A baking oven according to claim 1, comprising a vacuum pump which is connected to the baking chamber (7) and designed for controlled actuation and by which to set a given negative pressure in the baking chamber (7).

10. A baking oven according to claim 1, comprising a steaming assembly which is connected to the baking chamber (7) and designed for controlled actuation and by which to supply the baking chamber (7) with steam.

11. A baking oven according to claim 1, wherein the outer wall (8) of the baking chamber (7) expands in the shape of a funnel.

12. A baking oven according to claim 3, wherein the inner wall (9) expands upwards in the shape of a cone and parallel to the outer wall (8).

* * * * *